(12) United States Patent
Wang et al.

(10) Patent No.: US 10,589,472 B2
(45) Date of Patent: Mar. 17, 2020

(54) ASSEMBLING DEVICE

(71) Applicants: BOE TECHNOLOGY GROUP CO., LTD., Beijing (CN); BEIJING BOE CHATANI ELECTRONICS CO., LTD., Beijing (CN)

(72) Inventors: Tianbo Wang, Beijing (CN); Xinguang Zhang, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 143 days.

(21) Appl. No.: 15/647,247

(22) Filed: Jul. 11, 2017

(65) Prior Publication Data

US 2018/0056600 A1 Mar. 1, 2018

(30) Foreign Application Priority Data

Aug. 31, 2016 (CN) .................... 2016 2 1035737 U

(51) Int. Cl.
| | |
|---|---|
| *B32B 37/00* | (2006.01) |
| *B29C 65/00* | (2006.01) |
| *G02F 1/13* | (2006.01) |
| *G02F 1/1333* | (2006.01) |
| *B29L 12/00* | (2006.01) |
| *B29C 65/58* | (2006.01) |
| *B29L 31/34* | (2006.01) |

(52) U.S. Cl.
CPC ........ *B29C 66/8322* (2013.01); *G02F 1/1303* (2013.01); *G02F 1/133308* (2013.01); *B29C 65/58* (2013.01); *B29C 66/006* (2013.01); *B29C 66/54* (2013.01); *B29C 66/81431* (2013.01); *B29C 66/81463* (2013.01); *B29C 66/8362* (2013.01); *B29L 2012/00* (2013.01); *B29L 2031/3475* (2013.01)

(58) Field of Classification Search
CPC ............... B29C 66/8322; G02F 1/1303; G02F 1/133308; B32B 3/02; B30B 3/04
USPC ........................................................ 156/580
See application file for complete search history.

(56) References Cited

U.S. PATENT DOCUMENTS 6,394,439 B1 * 5/2002 Weber .................. B25B 1/2478
269/138

* cited by examiner

*Primary Examiner* — James D Sells
(74) *Attorney, Agent, or Firm* — Kinney & Lange, P.A.

(57) ABSTRACT

An assembling device is disclosed. The assembling device is used to assemble a plastic frame and a back plate together and includes: a pressing mechanism configured to press a region of the plastic frame; and a supporting device. The supporting device includes: a supporting platform configured to support the back plate and the plastic frame; and a supporting frame configured to support the pressing mechanism. The pressing mechanism is configured to contact the plastic frame at least one contact point, and a direction of a resultant force of forces applied at the at least one contact point by the pressing mechanism is at an acute angle with respect to a plane where a top surface of the plastic frame lies.

14 Claims, 3 Drawing Sheets

– 1 –
ASSEMBLING DEVICE

TECHNICAL FIELD

Embodiments of the present disclosure relate to the field of display technology, and particularly, to an assembling device.

BACKGROUND

With development and progress of sciences and technologies, display devices have been more and more widely used. An existing display device usually includes a display panel and a backlight module which includes a light source, a back plate and a plastic frame. During production of the backlight module, especially when long sides of the back plate and the plastic frame are being assembled, forces in horizontal direction and vertical direction towards the back plate need to be applied manually to assemble the plastic frame to the back plate, such that flanges of the back plate and the light source are inserted into a groove of the plastic frame.

Because assembling process of the back plate and the plastic frame of the backlight module is conducted manually, problems of difficulty in assembling and improper assembling exist. Moreover, even if the assembling is properly conducted, efficiency thereof is lower.

SUMMARY

The present disclosure has been made to overcome or alleviate at least one aspect of the above mentioned disadvantages.

Accordingly, it is an object of the present disclosure to provide an assembling device.

According to an exemplary embodiment, the assembling device is used to assemble a plastic frame and a back plate together, and the assembling device may comprise: a pressing mechanism configured to press a region of the plastic frame; and a supporting device. The supporting device comprises: a supporting platform configured to support the back plate and the plastic frame; and a supporting frame configured to support the pressing mechanism. The pressing mechanism is configured to contact the plastic frame at at least one contact point, and a direction of a resultant force of forces applied at the at least one contact point by the pressing mechanism is at an acute angle with respect to a plane where a top surface of the plastic frame lies.

According to another exemplary embodiment, the direction of the resultant force may be at an angle of 45 degrees with respect to the plane where the top surface of the plastic frame lies.

According to another exemplary embodiment, the pressing mechanism may comprise a first pressing roller configured to roll along an outer edge of the plastic frame.

According to another exemplary embodiment, an outer circumferential surface of the first pressing roller may be provided with an annular groove having a V-shaped cross section, and the annular groove has a first inclined surface and a second inclined surface that intersect each other; the first inclined surface is configured to contact the top surface of the plastic frame, the second inclined surface is configured to contact a side surface of the plastic frame, and a direction of a resultant force of forces applied by the first and second inclined surfaces to the plastic frame is at an acute angle with respect to the top surface of the plastic frame.

According to another exemplary embodiment, the pressing mechanism may comprise a second pressing roller configured to roll along the top surface of the plastic frame and a third pressing roller configured to roll along a side surface of the plastic frame, and a resultant force of forces applied by the second and third pressing rollers to the plastic frame is at an acute angle with respect to the top surface of the plastic frame.

According to another exemplary embodiment, the pressing mechanism may comprise a pressing block configured to slide along an outer edge of the plastic frame.

According to another exemplary embodiment, the supporting frame may comprise a rail mechanism and a sliding frame slidably mounted on the rail mechanism in an extension direction of the rail mechanism which is the same as an extension direction of an outer edge of the plastic frame, and the pressing mechanism is fixedly mounted to the sliding frame.

According to another exemplary embodiment, the rail mechanism may comprise two sliding rails disposed in parallel with each other and fixed to the supporting frame, and the sliding frame is configured to slidably cooperate with the two sliding rails.

According to another exemplary embodiment, the supporting platform may be provided with a fixing structure configured for fixing the back plate, the fixing structure comprises a raised platform protruding from a top surface of the supporting platform and at least two adjusting devices detachably connected to the top surface of the supporting platform, the raised platform is configured to match and locate a recess provided in a surface of the back plate facing away from the plastic frame; each of the at least two adjusting devices is configured to abut against a corresponding side surface of the back plate so as to fix the back plate on the raised platform.

According to another exemplary embodiment, each of the at least two adjusting devices may be provided with an elongate hole having a length direction perpendicular to the extension direction of the rail mechanism, a surface of the supporting platform is provided with a screw hole aligned in position with the elongate hole, each of the at least two adjusting devices is fixed to the supporting platform by a screw passing through the elongate hole and threaded to the screw hole.

According to another exemplary embodiment, the assembling device may further comprise a driving device configured to drive the pressing mechanism to move along an outer edge of the plastic frame.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION

Figure 1:
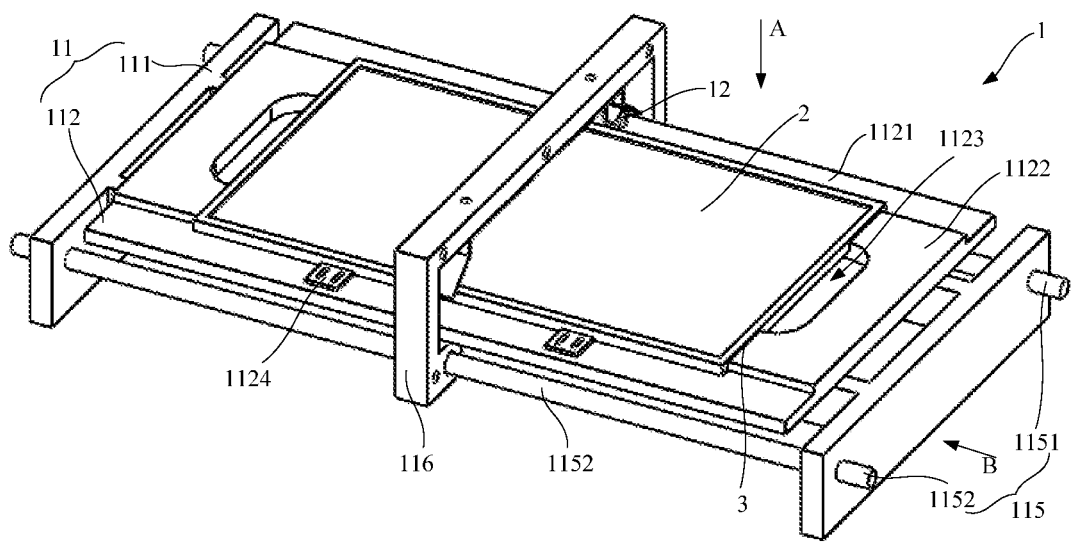
FIG. 1 is an illustrative perspective view showing an assembling device according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to an embodiment of the present disclosure, there is provided an assembling device. As shown in FIGS. 1 to 4, the assembling device 1 is used to assemble engaging portions of a plastic frame 2 and a back plate 3 of a backlight module, for example, to assemble corresponding engaging portions at two side regions of the plastic frame and the back plate.

The assembling device 1 includes a supporting device 11 and at least one pressing mechanism 12; the pressing mechanism 12 applies pressing forces at the engaging portions of the plastic frame and the back plate, so as to achieve an effective engagement between engaging portions of the plastic frame 2 and the back plate 3.

Figure 2:
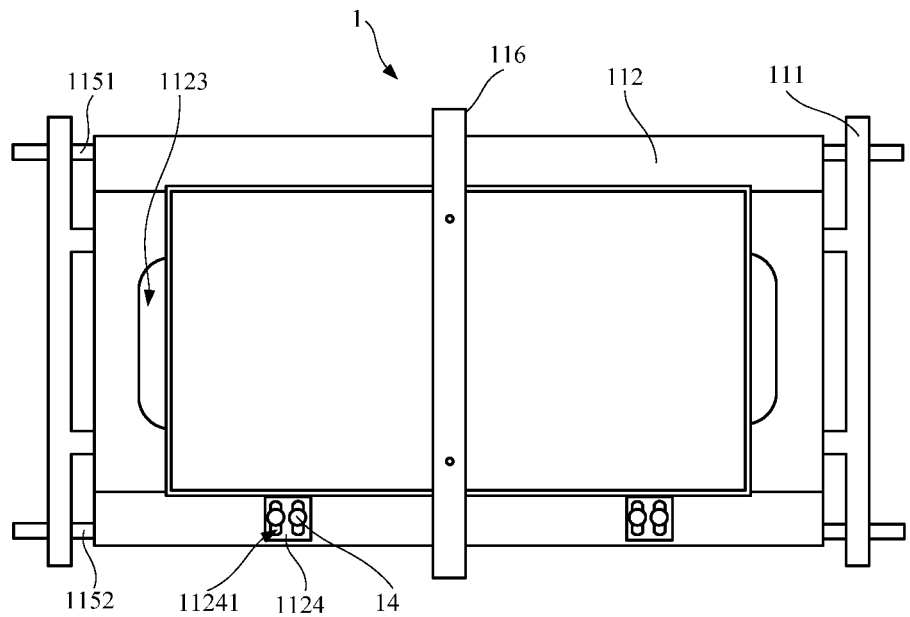
FIG. 2 is an illustrative top view of the assembling device of FIG. 1 viewed in direction A.
Figure 3:
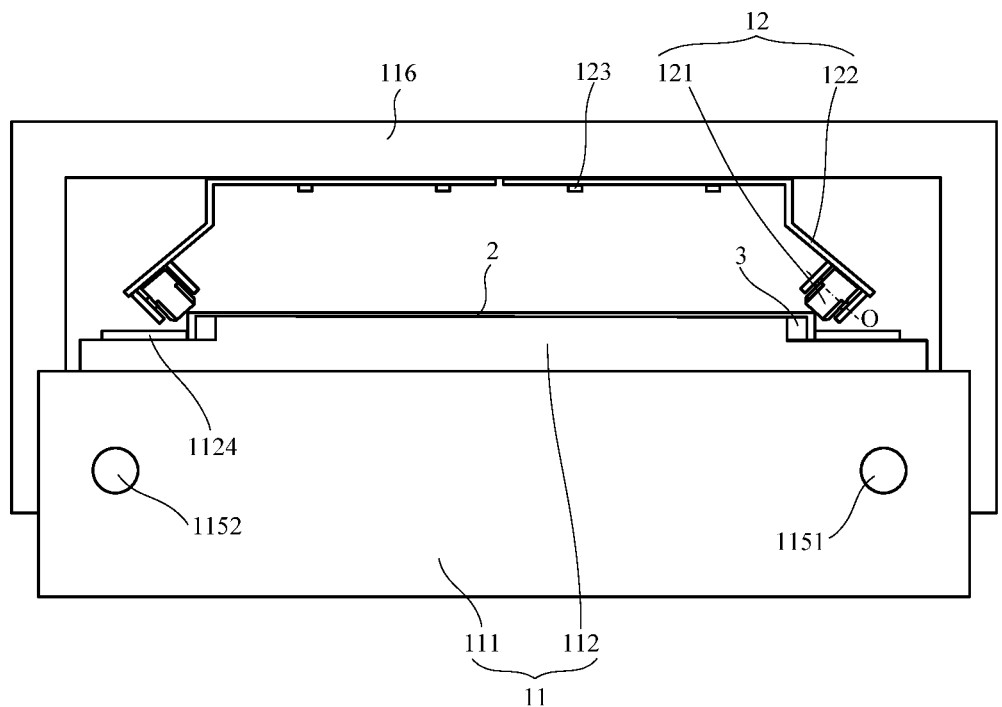
FIG. 3 is an illustrative side view of the assembling device of FIG. 1 viewed in direction B.
Figure 4:
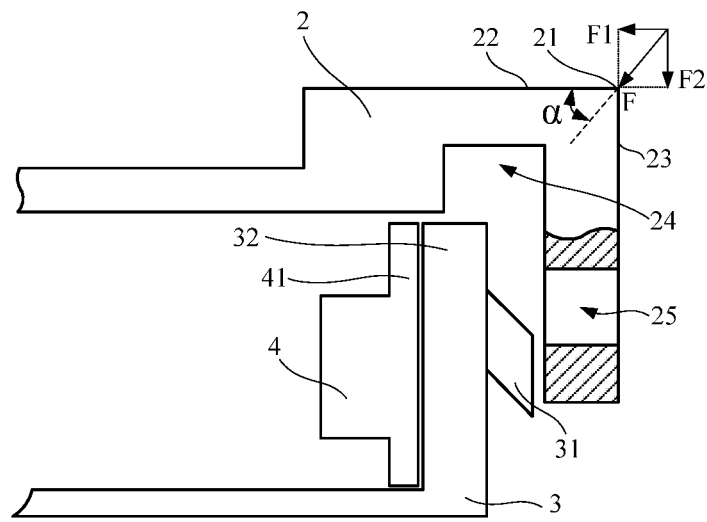
FIG. 4 is an enlarged partial view showing engaging portions of a plastic frame and a back plate before they are assembled together according to an embodiment of the present disclosure.

Each pressing mechanism 12 is used to press one region of the plastic frame 2 that is to be pressed. As shown in FIG. 4, for example, each pressing mechanism 12 applies a pressing force at an outer edge 21. In an example, a plurality of pressing mechanisms 12 may apply pressing forces at a plurality of outer edges 21 simultaneously, which may improve efficiency of engaging operations. As shown in FIGS. 1 to 3, the assembling device 1 includes two pressing mechanisms 12 disposed opposite to one another, and each pressing mechanism 12 corresponds to one of the outer edges 21 of the plastic frame 2. In other examples, the assembling device 1 may include more pressing mechanisms 12.

To be noted, the outer edge 21 is an outer edge of plastic frame 2 within the region to be pressed where forces can be easily applied by the pressing mechanism 12. As shown in FIG. 4, the outer edge 21 is an intersection line between a top surface 22 (i.e. upper surface) and a side surface 23 of the plastic frame 2. In another embodiment, the region to be pressed may include a region adjacent to the outer edge 21, for example, a region including a portion of the top surface 22 adjacent to the outer edge 21 and/or a portion of the side surface 23 adjacent to the outer edge 21.

The supporting device 11 includes a supporting platform 112 configured for carrying the back plate 3 and the plastic frame 2 and a supporting frame 111 configured for carrying at least one pressing mechanism 12. The pressing mechanism 12 is disposed on the supporting frame 111, each pressing mechanism 12 corresponds to one region to be pressed, and at least one contact point is formed between each pressing mechanism 12 and the plastic frame 2. An acute angle is formed between a plane where the top surface 22 of the plastic frame 2 lies and a direction of a resultant force F of forces applied by the pressing mechanism 12 on the plastic frame 2 at each of the contact points of plastic frame 2. As shown in FIG. 4, the direction of the resultant force F and the top surface 22 of the plastic frame 2 forms an acute angel α.

In practice, first of all, the back plate 3 is disposed on the supporting platform 112, then the plastic frame 2 is disposed on the back plate 3 such that the engaging region of the plastic frame 2 is aligned with the engaging region of the back plate 3; then, two pressing mechanisms 12 are adjusted to correspond to the two outer edges 21 of the plastic frame 2 respectively, each pressing mechanism 12 forms at least one contact point with a corresponding outer edge 21, and the direction of the resultant force F of the forces applied by each of the pressing mechanisms 12 on the plastic frame 2 forms an acute angle α with respect to the plane where the top surface 22 of the plastic frame 2 lies.

Assuming that the plastic frame 2 and the back plate 3 are disposed horizontally and the back plate 3 is disposed under the plastic frame 2, the resultant force F may be resolved into a first component force F1 and a second component force F2 that are perpendicular to one another. The first component force F1 is oriented in a horizontal direction, and the second component force F2 is oriented in a vertical direction. Since the acute angle α is not 0 degree or 90 degrees, thus either of the component forces F1, F2 perpendicular to one another is not 0 degree. Therefore, a region of the plastic frame 2 being pressed (or the engaging portion) moves towards the back plate 3 in the downward direction and in a direction towards the center of the back plate 3. For example, as shown in FIG. 4, under the action of the pressing mechanism 12, the engaging portion of the plastic frame 2 moves towards the back plate 3, and finally, a engaging groove 24 of the plastic frame 2 is engaged onto a corresponding flange 32 of the back plate 3, and a hook 31 of the back plate 3 is snapped into a throughhole 25 of the plastic frame 2, such that assembling operation of the plastic frame 2 and the back plate 3 is accomplished. With the assembling device 1, mechanical and automatic assembling of the plastic frame 2 and back plate 3 can be achieved, manpower can be saved, labor intensity can be reduced and assembling efficiency of the plastic frame 2 and the back plate 3 can be improved. Moreover, with the pressing mechanism 12 of the assembling device 1, the plastic frame 2 can be effectively assembled to the back plate 3, such that problems of improper assembling and difficulty in assembling can be eliminated.

The pressing mechanism 12 may have various structures.

In an exemplary embodiment, as shown in FIG. 3, each pressing mechanism 12 of the assembling device 1 includes a first pressing roller 121 rotatable about its own first axis O, the first axis O intersects with the top surface 22 of the plastic frame 2 at an acute angle, and the first pressing roller 121 can roll along an outer edge 21 of the plastic frame 2.

With the first pressing roller 121, the engaging portion of the plastic frame 2 and the engaging portion of the back plate 3 can be engaged together as the first pressing roller 121 rolls and applies pressure along the outer edge 21 of the plastic frame 2. Since the first pressing roller 121 rolls with respect to the plastic frame 2, friction resistance between the first pressing roller 121 and the plastic frame 2 can be reduced, driving force for the first pressing roller 121 can be reduced and damage to the plastic frame 2 due to friction can reduced simultaneously.

Figure 5:
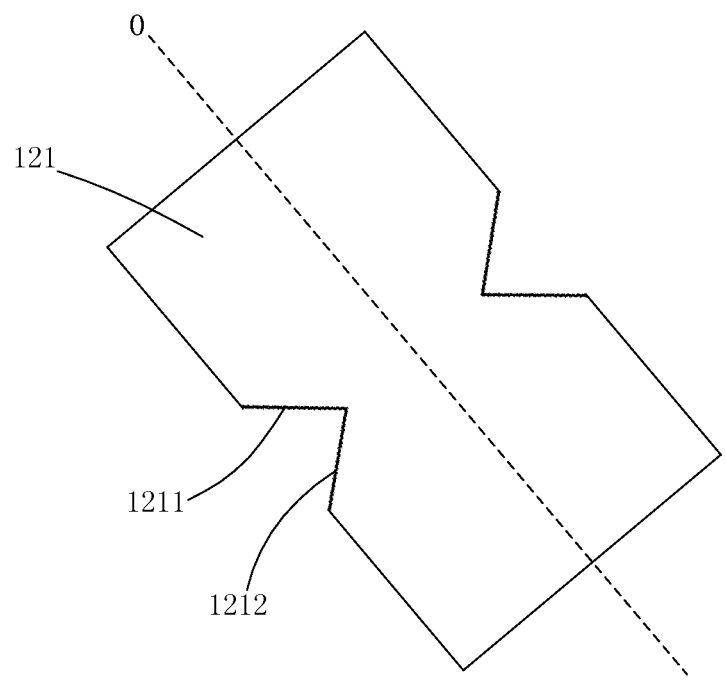
FIG. 5 is an illustrative structure drawing showing a pressing roller according to an embodiment of the present disclosure.

In a modified embodiment, as shown in FIG. 5, an outer circumferential surface of the first pressing roller 121 is provided with an annular groove having a V-shaped cross section. The annular groove is formed by a first inclined surface 1211 and a second inclined surface 1212. In use, the first inclined surface 1211 will contact the top surface 22 of the plastic frame 2, and the second inclined surface 1212 will contact the side surface 23 of the plastic frame 2, the resultant force F of forces applied by the first inclined surface 1211 and the second inclined surface 1212 on the plastic frame 2 is at acute angle α with respect to the top surface 22.

With the annular groove having V-shaped cross section being provided in the outer circumferential surface of the first pressing roller 12, the first pressing roller 121 can be quickly located to the outer edge 21 of the plastic frame 2 by means of the annular groove, such that the first pressing roller 121 may be quickly and accurately aligned with the plastic frame 2 and efficiency of assembling the plastic frame 2 and the back plate 3 is improved.

Figure 6:
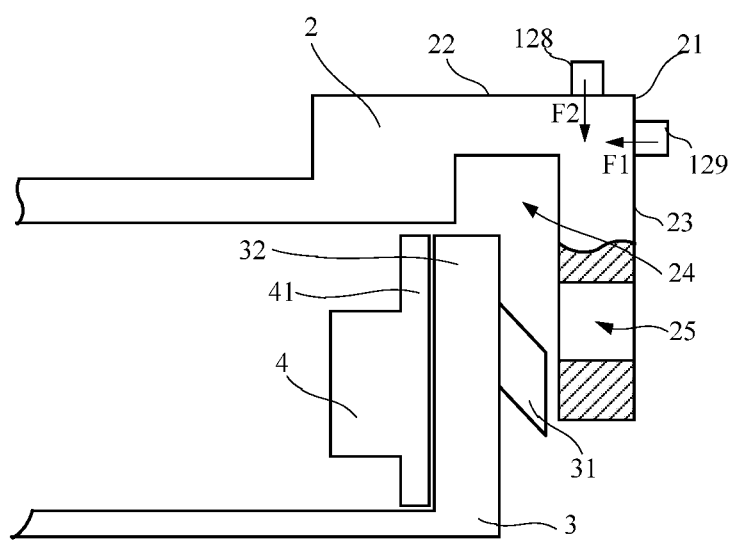
FIG. 6 is an illustrative drawing showing two pressing rollers pressing the plastic frame according to an embodiment of the present disclosure.

In another exemplary embodiment, as shown in FIG. 6, each pressing mechanism 12 includes a second pressing roller 128 rotatable about a second axis and a third pressing roller 129 rotatable about a third axis. The second axis and the third axis intersect with each other at a position outside of the plastic frame 2. The second axis is parallel with the top surface 22 of the plastic frame 2 and the second pressing roller 128 may roll along the top surface 22 of the plastic frame 2; the third axis is parallel with the side surface 23 intersecting with the top surface 22 of the plastic frame 2, and the third pressing roller 129 may roll along the side surface 23 of the plastic frame 2; the direction of the resultant force F of forces applied by the second pressing roller 128 and the third pressing roller 129 on the plastic frame 2 is at an acute angle α with respect to the top surface 22 of the plastic frame 2.

With the pressing mechanism 12 being provided with the second pressing roller 128 and the third pressing roller 129, the pressing mechanism 12 may apply pressure on the top surface 22 of the plastic frame 2 through the second pressing roller 128 and apply pressure on the side surface 23 of the plastic frame 2 through the third pressing roller 129 simultaneously, such that the engaging portion of the plastic frame 2 moves downwards and inwards and the flange 32 of the back plate 3 and a light bar 41 of the light source 4 can be inserted into the engaging groove of the plastic frame 2. With the two pressing rollers, the plastic frame 2 may be applied with pressures at two side surfaces at the same time, and the pressures can be adjusted separately. In an exemplary embodiment, pressures may be applied on the two surfaces 22, 23 of the plastic frame 2 successively (for example, the second pressing roller 128 applies pressure first to move the engaging portion of the plastic frame 2 downwards by a certain distance, then the third pressing roller 129 applies pressure to move the engaging portion of the plastic frame 2 inwards, or vice versa. Therefore, with this configuration, assembling process may be properly adjusted according to practical situation, so as to facilitate the assembling process.

In another exemplary embodiment, each pressing mechanism 12 includes a pressing block having a planar surface facing the plastic frame 2. The planar surface is at the acute angle α with respect to the top surface 22 of the plastic frame 2, and the first pressing block can slide along the outer edge 21 of the plastic frame 2. This embodiment is substantially the same as the embodiment utilizing the first pressing roller, and the only difference therebetween is in that the first pressing roller is replaced by the pressing block.

In some practical situations, when the force applied on the top surface and the force applied on the side surface of the plastic frame 2 have substantially the same value, the plastic frame 2 may be effectively engaged onto the back plate 3. For example, a resultant force of two component forces F1, F2 perpendicular to each other is directed to the center of the back plate 3 and a direction of the resultant force is at an angle of 40-50 degrees (i.e., an acute angle α) with respect to the top surface 22 of the plastic frame 2. Preferably, the acute angle α is 45 degrees, and that is, the resultant force F is at an angle of 45 degrees with respect to the top surface 22 of the plastic frame 2.

As shown in FIG. 4, when a force F applied by the pressing mechanism 12 is at an angle of 45 degrees with respect to the top surface 22 of the plastic frame 2, the force F may be resolved into a first component force F1 and a second component force F2 that are perpendicular to one another. In such a case, the engaging portion of the plastic frame 2 moves at substantially the same speed in the horizontal direction and the vertical direction under the action of the pressing mechanism 12, such that the flange 32 of the back plate 3 may be successfully engaged into the engaging groove 24 of the plastic frame 2.

In an exemplary embodiment, as shown in FIGS. 1, 2 and 3, the supporting frame 111 includes a rail mechanism 115 and a sliding frame 116, the sliding frame 116 is slidably mounted on the rail mechanism 115 and capable of sliding along the rail mechanism 115 in an extension direction of the rail mechanism 115, and the extension direction of the rail mechanism 115 is the same as an extension direction of the outer edge of the plastic frame 2. The pressing mechanisms 12 are relatively fixedly mounted on the sliding frame 116.

Sliding of the sliding frame 116 along the extension direction of the rail mechanism 115 drives the pressing mechanism 12 to move, the pressing mechanism 12 is moved along the outer edge 21 and applies pressure to the plastic frame 2 at the same time, and the engaging portion of the plastic frame 2 and the engaging portion of the back plate 3 can be engaged together continuously, such that assembling operation of plastic frame 2 and the back plate 3 can be accomplished during the sliding of the sliding frame 116, speed and efficiency of assembling operation of the plastic frame 2 and the back plate 3 may be improved, and automatization of the assembling operation may be facilitated.

In a further exemplary embodiment, as shown in FIGS. 1, 2 and 3, the rail mechanism 115 may include a first sliding rail 1151 and a second sliding rail 1152 that are disposed in parallel with one another and fixed to the supporting frame 111, two ends of the sliding frame 116 slidably cooperate with the first and the second sliding rails. As shown in FIGS. 1 and 2, the rail mechanism 115 includes the first sliding rail 1151 and the second sliding rail 1152 disposed in parallel with one another, and the sliding frame 116 is provided with through holes fitted around the first sliding rail 1151 and the second sliding rail 1152, respectively.

In an exemplary embodiment, as shown in FIG. 3, each pressing mechanism 12 may include one first pressing roller 121 and a bracket 122 for supporting the first pressing roller 121 to rotate, and the bracket 122 is fixed to the sliding frame 116 through a screw 123, such that the pressing mechanism 12 can be moved relative to the plastic frame 2 by the sliding frame 116. Further, in order to adjust a relative position of the first pressing roller 121 such that the first pressing roller 121 can be aligned in position with the outer edge 21 of the plastic frame 2, the bracket 122 may be provided with a plurality of through holes or an oblong through hole, through which the screw 123 can be passed and fixed, such that the position of the bracket 122 can be adjusted by adjusting a relative position of the screw 123 with respect to the plurality of through holes or the oblong through hole, so as to align the position of the first pressing roller 121 with the position of the outer edge 21 of the plastic frame 2, thereby improving quality of assembling of the plastic frame 2 and the back plate 3.

Moreover, a distance between the pressing mechanism 12 and the supporting platform 112 may also be adjusted by the screw 123, so as to adjust the pressure applied on the plastic frame 2 by the pressing mechanism 12, such that the flange 32 of the back plate 3 can be completely engaged into the engaging groove 24 of the plastic frame 2.

In order to further improve quality of assembling of the plastic frame 2 and the back plate 3, the supporting platform 112 is further provided with a fixing structure for fixing the back plate 3, as shown in FIGS. 1 and 2.

Since the supporting platform 112 is provided with the fixing structure (specific structure thereof will be described in detail hereinafter) for fixing the back plate 3, the back plate 3 can be prevented from moving relative to the supporting platform 112, such that reliability of the assembling operation of the plastic frame 2 and the back plate 3 can be improved. With the fixing structure, back plates of a same batch can be fixed at the same position, so that the position of the pressing mechanism needs not to be adjusted during assembling these back plates, thus, production time can be further saved and production quality can be further improved.

In an exemplary embodiment, as shown in FIGS. 1 and 3, the fixing structure may include a raised platform 1122 protruding from a top surface 1121 of the supporting platform 112 and at least two adjusting devices 1124 detachably connected to the top surface 1121 of the supporting platform 112. The raised platform 1122 is used to match and locate a recess formed in a side of the back plate 3 facing away from the plastic frame 2, and each of the at least two adjusting devices 1124 is abutted against a corresponding side surface of the back plate 3 to fix the back plate 3 to the raise platform 1122.

In order to increase universality of the assembling device such that back plates 3 of different sizes can be mounted on the supporting platform 112, each adjusting device 1124 is provided with an elongate hole 11241, a length direction of the elongate hole 11241 is perpendicular to the extension direction of the rail mechanism 115; a surface of the supporting platform 112 is provided with threaded holes corresponding to positions of elongate holes 11241 of the adjusting devices 1124 respectively, a adjusting screw 14 is passed through the elongate holes 11241 and threaded into with a corresponding threaded hole, so as to fix a corresponding one of the adjusting devices 1124 to the supporting platform 112.

When a different back plate 3 is to be fixed, the position of the adjusting screw 14 in the elongate hole 11241 may be adjusted, such that a distance between the adjusting device 1124 and the raised platform 1122 is adjusted to adapt to the size of the back plate 3. In such a manner, the assembling device 1 can be adapted to assembling operation between various plastic frames 2 and back plates 3, and thereby having a wide range of application.

In order to facilitate laying down the back plate 3 on the supporting platform 112 or picking up the back plate 3 from the supporting platform 112, according to an exemplary embodiment, the top surface of the raised platform 1122 is provided with a recess 1123 for laying down or picking up the back plate, as shown in FIGS. 1 and 2. The recess 1123 may be an oblong groove or a recess having another shape.

In order to achieve automatization of assembling the plastic frame 2 and the back plate 3, the assembling device 1 further includes a driving device for driving the sliding frame 116 to slide relative to the rail mechanism 115. The driving device may be any suitable driving device, such as a hydraulic driving device, a pneumatic driving device or an electric driving device. When the sliding frame 116 is driven to slide by the driving device, the pressing mechanism 12 mounted on the sliding frame 116 is also moved.

The first pressing roller 121, the second pressing roller 128, the third pressing roller 129 and the first pressing block mentioned in the above embodiments may be made of silastic material. When the pressing roller or the pressing block made of silastic material is used to press the plastic frame 2, the plastic frame 2 may be protected from being damaged, which may improve pass-rate of production.

The supporting platform 112 of the supporting device may be fixed on the supporting frame 111. For example, the supporting platform 112 may be fixed on the supporting frame 111 through fasteners such as bolts.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An assembling device, configured for assembling a plastic frame and a back plate together, the assembling device comprising:
   a pressing mechanism configured to press two opposite regions of the plastic frame; and
   a supporting device comprising:
      a supporting platform configured to support the back plate and the plastic frame; and
      a supporting frame configured to support the pressing mechanism,
   wherein the pressing mechanism is configured to contact the plastic frame at at least one pair of opposite contact points, such that a direction of a resultant force of forces applied at each of the at least one pair of opposite contact points by the pressing mechanism is at an acute angle with respect to a plane where a top surface of the plastic frame lies, and the resultant force of the forces applied at each of the at least one pair of opposite contact points by the pressing mechanism is directed towards a position between the at least one pair of opposite contact points.

2. The assembling device according to claim 1, wherein the direction of the resultant force is at an angle of 45 degrees with respect to the plane where the top surface of the plastic frame lies.

3. An assembling device, configured for assembling a plastic frame and a back plate together, the assembling device comprising:
   a pressing mechanism configured to press a region of the plastic frame; and
   a supporting device comprising:
   a supporting platform configured to support the back plate and the plastic frame; and
   a supporting frame configured to support the pressing mechanism,
   wherein the pressing mechanism is configured to contact the plastic frame at at least one contact point, and a direction of a resultant force of forces applied at the at least one contact point by the pressing mechanism is at an acute angle with respect to a plane where a top surface of the plastic frame lies, and
   wherein the pressing mechanism comprises a pressing roller configured to roll along an outer edge of the plastic frame.

4. The assembling device according to claim 3,
wherein an outer circumferential surface of the pressing roller is provided with an annular groove having a V-shaped cross section, and the annular groove has a first inclined surface and a second inclined surface that intersect each other; and
wherein the first inclined surface is configured to contact the top surface of the plastic frame, the second inclined surface is configured to contact a side surface of the plastic frame, and a direction of a resultant force of forces applied by the first and second inclined surfaces to the plastic frame is at an acute angle with respect to the top surface of the plastic frame.

5. An assembling device, configured for assembling a plastic frame and a back plate together, the assembling device comprising:
a pressing mechanism configured to press a region of the plastic frame; and
a supporting device comprising:
a supporting platform configured to support the back plate and the plastic frame; and
a supporting frame configured to support the pressing mechanism,
wherein the pressing mechanism is configured to contact the plastic frame at at least one contact point, and a direction of a resultant force of forces applied at the at least one contact point by the pressing mechanism is at an acute angle with respect to a plane where a top surface of the plastic frame lies, and
wherein the pressing mechanism comprises a first pressing roller configured to roll along the top surface of the plastic frame and a second pressing roller configured to roll along a side surface of the plastic frame, and a resultant force of forces applied by the first and second pressing rollers to the plastic frame is at an acute angle with respect to the top surface of the plastic frame.

6. The assembling device according to claim 1, wherein the pressing mechanism comprises a pressing block configured to slide along an outer edge of the plastic frame.

7. The assembling device according to claim 1, wherein the supporting frame comprises a rail mechanism and a sliding frame slidably mounted on the rail mechanism in an extension direction of the rail mechanism which is the same as an extension direction of an outer edge of the plastic frame, and the pressing mechanism is fixedly mounted to the sliding frame.

8. The assembling device according to claim 7, wherein the rail mechanism comprises two sliding rails disposed in parallel with each other and fixed to the supporting frame, and the sliding frame is configured to slidably cooperate with the two sliding rails.

9. The assembling device according to claim 7, wherein:
the supporting platform is provided with a fixing structure configured for fixing the back plate,
the fixing structure comprises a raised platform protruding from a top surface of the supporting platform and at least two adjusting devices detachably connected to the top surface of the supporting platform,
the raised platform is configured to match and locate a recess provided in a surface of the back plate facing away from the plastic frame; and
each of the at least two adjusting devices is configured to abut against a corresponding side surface of the back plate so as to fix the back plate on the raised platform.

10. The assembling device according to claim 9, wherein:
each of the at least two adjusting devices is provided with an elongate hole having a length direction perpendicular to the extension direction of the rail mechanism;
a surface of the supporting platform is provided with a screw hole aligned in position with the elongate hole; and
each of the at least two adjusting devices is fixed to the supporting platform by a screw passing through the elongate hole and threaded to the screw hole.

11. The assembling device according to claim 1, further comprising a driving device configured to drive the pressing mechanism to move along an outer edge of the plastic frame.

12. The assembling device according to claim 1, wherein the pressing mechanism comprises a pressing roller configured to roll along an outer edge of the plastic frame.

13. The assembling device according to claim 12,
wherein an outer circumferential surface of the pressing roller is provided with an annular groove having a V-shaped cross section, and the annular groove has a first inclined surface and a second inclined surface that intersect each other; and
wherein the first inclined surface is configured to contact the top surface of the plastic frame, the second inclined surface is configured to contact a side surface of the plastic frame, and a direction of a resultant force of forces applied by the first and second inclined surfaces to the plastic frame is at an acute angle with respect to the top surface of the plastic frame.

14. The assembling device according to claim 1, wherein the pressing mechanism comprises a first pressing roller configured to roll along the top surface of the plastic frame and a second pressing roller configured to roll along a side surface of the plastic frame, and a resultant force of forces applied by the first and second pressing rollers to the plastic frame is at an acute angle with respect to the top surface of the plastic frame.

* * * * *